Patented Nov. 8, 1949

2,487,707

UNITED STATES PATENT OFFICE 2,487,707

[β-(5.7-DICHLOROQUINOLYL-(8)-OXY)-ETHYL] - DIMETHYL - DODECYL AMMONIUM BROMIDE

Max Hartmann and Werner Bosshard, Riehen, Switzerland, assignors to Ciba Pharmaceutical Products, Incorporated, Summit, N. J.

No Drawing. Application March 28, 1944, Serial No. 528,481. In Switzerland July 30, 1943

1 Claim. (Cl. 260—286)

It has been found that quinolyloxyalkyl-ammonium compounds possess good disinfecting and preserving properties and can be used as disinfecting and preserving agents. Particularly valuable are disinfecting and preserving agents containing quinolyloxyalkylammonium compounds, in which the quinoline radical is substituted by one or more halogen atoms, and in which the oxygen atom of the quinolyloxy group is connected to the quaternary nitrogen atom by means of an alkylene radical of low molecular weight (e. g. the ethylene radical), and which contain at the quarternary nitrogen atom, in addition to the quinolyloxyalkyl group, at least one radical with more than 6 carbon atoms. These compounds may contain further substituents in addition to the halogen atoms. The ring nitrogen atom of the quinoline nucleus can also be quaternary. The following compounds may be mentioned as examples:

[β-(Quinolyl-(8)- or -(6)-or-(3)-oxy)-ethyl]-dimethyl-dodecyl-ammonium-chloride, [β - (5.7-dichloro-quinolyl -(8) - oxy)-ethyl]-dimethyl-dodecyl-ammonium-bromide, [β-(1-methyl-5.7-dichloro-quinolinium-methosulphate - (8) - oxy)-ethyl]-dimethyl - dodecyl - ammonium-bromide, [β-(5.7-dichloro - quinolyl - (8) oxy) - ethyl]-dimethyl-hexadecyl-ammonium-bromide, [β - (5-chloro - 7 - bromo - quinolyl - (8)-oxy)-ethyl]-dimethyl-dodecyl-ammonium-bromide, [β - (2-methyl - 5 - chloro - quinolyl)-(8)-oxy)-ethyl]-dimethyl-dodecyl-ammonium-bromide, [β - (2-methyl-5.7-dichloro-quinolyl-(8)-oxy)-ethyl]-dimethyl - dodecyl - ammonium-bromide, [β-(5-chloro-quinolyl-(8) - oxy) - ethyl]-diethyl-octyl-ammonium-bromide, [β - (5.7-dichloro-quinolyl-(8)-oxy)-ethyl] - diethyl - dodecyl-ammonium-bromide and [β-(5-chloro-7-iodo-quinolyl-(8)-oxy) - ethyl]-dibutyl-benzyl-ammonium-chloride. The compounds mentioned are easily soluble in water and some of them crystallize well. The appended claim is directed to that embodiment of the invention which involves the [β-(5.7-dichloro-quinolyl-(8)-oxy)-ethyl]-dimethyl-dodecyl- ammonium-bromide.

The new disinfecting and preserving agents may be used in very different fields. They are suitable, for example, for disinfecting the skin (e. g. the hands), instruments, bandages, linen, etc., and for disinfecting or preserving foodstuffs and animal fodder.

The quinoline compounds mentioned can be used alone or in solution or as an emulsion and/or mixed with other active or inert substances such as ointments or in the form of dry powders.

The quinolyloxyalkyl-ammonium compounds are new. They may be prepared, for example, by treating quinolyloxyalkyl-amines with agents capable of forming quaternary compounds. The quinolyloxyalkyl-amines are either known or can be prepared by known methods as described, for example, in the U. S. Patent No. 1,891,980.

It is indeed known that halogenquinolyloxyalkyl-amines and halogenaryloxyalkyl-amines possess antiseptic properties, as is seen, for example, from the U. S. Patent No. 1,891,980 already mentioned. It was, however, experimentally shown that by converting halogenaryloxyalkyl-amines into the quaternary compound, e. g., by causing β-(4-bromo-naphtyl-(1)-oxy)-ethyl-diethyl-amine to react with dodecyl bromide, compounds which are almost insoluble in water, and which have no increased disinfecting action, are obtained. It is therefore surprising that quinolyloxyalkyl-ammonium compounds have considerably increased disinfecting and preserving properties, as compared with the non-quaternary compounds and are at the same time easily soluble in water.

*Example 1*

85 parts of [β-(5.6-dichloro-quinolyl-(8)-oxy)-ethyl]-dimethyl-dodecyl-ammonium-bromide of the formula

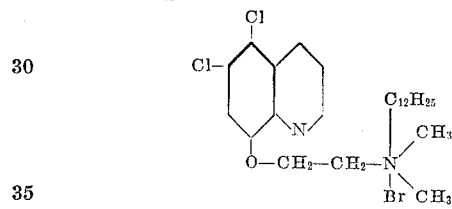

(obtained, for example, by heating β-(5.7-dichloro-quinolyl-(8)-oxy)-ethyl - diethyl - amine with dodecyl bromide) are compressed into tablets with 15 parts of starch, with the addition if necessary of substances which accelerate disintegration in water.

*Example 2*

10 parts of [β-(6-chloro-quinolyl-(8)-oxy)-ethyl]-diethyl-dodecyl - ammonium - bromide of the formula

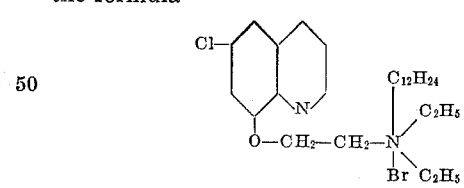

(prepared, for example, from β-(6-chloro-quinolyl-(8)-oxy)-ethyl-diethyl-amine and dodecyl bromide) are dissolved in water and made up with water to 100 parts by volume. Dyestuffs or odorants may be added to the solution.

*Example 3*

By gently warming on a water-bath, 1 part of [β-(quinolyl-(8) - oxy)-ethyl]-diethyl-heptadecyl-ammonium-bromide of the formula

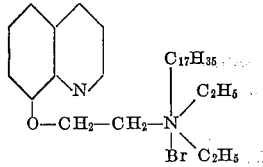

(obtained, for example, by heating β-(quinolyl-(8)-oxy)-ethyl-diethyl-amine with heptadecyl bromide) is dissolved in an ointment base consisting of 65 parts of white soft paraffin, 20 parts of paraffin oil, 10 parts of wool-fat and 4 parts of water. The preparation is cooled slowly, stirring continually.

*Example 4*

0.5–5 parts (as required of [β-(5-chloro-7-iodoquinolyl-(8)-oxy-ethyl]-dimethyl-decyl-ammonium-bromide of the formula

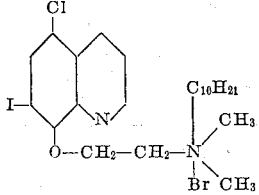

(prepared by the action of decyl bromide on β-(5 - chloro - 7 - iodoquinolyl - (8) -oxy)-ethyl-dimethyl-amine) are mixed with 99.5–95 parts of a finely powdered diluent such as kaolin, boric acid, urea or similar substances, obtaining in this way a dusting powder which is very suitable for use.

What we claim is:

A disinfecting and preserving agent comprising as active disinfecting and preserving ingredient [β-(5.7-dichloro-quinolyl-(8)-oxy)-ethyl]-dimethyl-dodecyl-ammonium-bromide of the formula

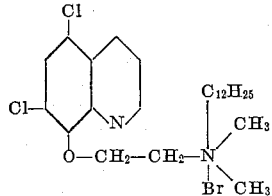

MAX HARTMANN.
WERNER BOSSHARD.

REFERENCES CITED

The following references are of record in the file of this patent:

UNITED STATES PATENTS

| Number | Name | Date |
|---|---|---|
| 1,891,980 | Hartmann et al. | Dec. 27, 1932 |
| 2,108,765 | Domagk | Feb. 15, 1938 |
| 2,113,606 | Taub | Apr. 12, 1938 |
| 2,435,458 | Mosher et al. | Feb. 3, 1948 |

FOREIGN PATENTS

| Number | Country | Date |
|---|---|---|
| 393,276 | Great Britain | 1933 |

OTHER REFERENCES

Baker et al., J. Exp't'l. Med., vol. 73, pp.249–271 (1941).

Rawlins et al., J. Amer. Pharm. Assoc. (Sci. Ed.), vol. 32, pp. 11–16 (1943).

Certificate of Correction

Patent No. 2,487,707                          November 8, 1949

MAX HARTMANN ET AL.

It is hereby certified that errors appear in the printed specification of the above numbered patent requiring correction as follows:

Column 1, line 13, for "quarternary" read *quaternary*; line 27, for "(8)oxy)" read *(8)-oxy)*; column 3, line 24, after the word "required" insert a closing parenthesis; line 25, after "oxy" and before the hyphen insert a closing parenthesis; and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*